United States Patent
Mazor (10) Patent No.: US 9,900,382 B2
(45) Date of Patent: Feb. 20, 2018

(54) PROMOTION OF INTERNET-OF-THINGS (IOT) CONNECTIVITY

(71) Applicant: Anna Mazor, Ness Ziona (IL)

(72) Inventor: Anna Mazor, Ness Ziona (IL)

( * ) Notice: Subject to any disclaimer, the term of this patent is extended or adjusted under 35 U.S.C. 154(b) by 262 days.

(21) Appl. No.: 14/663,660

(22) Filed: Mar. 20, 2015

(65) Prior Publication Data
US 2016/0241641 A1    Aug. 18, 2016

Related U.S. Application Data

(60) Provisional application No. 62/117,572, filed on Feb. 18, 2015.

(51) Int. Cl.
| | |
|---|---|
| G06F 15/173 | (2006.01) |
| H04L 29/08 | (2006.01) |
| H04L 12/28 | (2006.01) |
| H04W 4/00 | (2018.01) |
| H04W 4/18 | (2009.01) |

(52) U.S. Cl.
CPC ...... *H04L 67/1087* (2013.01); *H04L 12/2803* (2013.01); *H04L 67/2823* (2013.01); *H04W 4/005* (2013.01); *H04W 4/18* (2013.01)

(58) Field of Classification Search
CPC ............. H04L 67/1087; H04L 67/2823; H04L 12/2803
USPC ....................................................... 709/223
See application file for complete search history.

(56) References Cited

U.S. PATENT DOCUMENTS

| | | | | |
|---|---|---|---|---|
| 9,009,230 B1 * | 4/2015 | Matthieu | ................ | H04L 67/12 709/204 |
| 9,762,556 B2 * | 9/2017 | James | ................ | H04L 63/0442 |
| 2013/0041997 A1 * | 2/2013 | Li | .......................... | H04W 4/005 709/223 |
| 2013/0173621 A1 * | 7/2013 | Kapoor | ............. | G06F 17/30707 707/737 |
| 2014/0108943 A1 * | 4/2014 | Lee | ..................... | G06F 3/04817 715/738 |
| 2014/0359131 A1 * | 12/2014 | Seed | ..................... | H04L 47/125 709/226 |
| 2015/0019710 A1 * | 1/2015 | Shaashua | .......... | G06F 17/30705 709/224 |
| 2015/0134954 A1 * | 5/2015 | Walley | .................... | H04L 63/08 713/168 |
| 2015/0201022 A1 * | 7/2015 | Kim | ...................... | H04W 4/005 709/203 |
| 2015/0381776 A1 * | 12/2015 | Seed | ....................... | H04L 67/16 709/203 |
| 2016/0065653 A1 * | 3/2016 | Chen | ....................... | H04L 67/10 715/735 |
| 2016/0088049 A1 * | 3/2016 | Seed | ....................... | G06F 9/541 709/203 |

(Continued)

*Primary Examiner* — Imad Hussain
(74) *Attorney, Agent, or Firm* — Occhiuti & Rohlicek LLP (57) ABSTRACT

A data-processing system that implements a B2B IoT marketplace includes a dictionary of data structures for each of a plurality of registered IoT devices, a translator for mapping a data structure in a first IoT device to a corresponding data structure in a second IoT device, and a platform configured for interaction with IoT device makers to enable a first IoT device maker to register an IoT device, and for enabling the first IoT device maker to identify other IoT devices with which the first IoT device is to establish operability.

18 Claims, 5 Drawing Sheets

| Data structure | Description | |
|---|---|---|
| <devicetype>fitbit bracelet</devicetype> | The type of the device that sends the communication | |
| <manufacture>fitbit </manufacture> | The name of the manufacture | |
| <locationcounty>US</locationcounty> | The country where the device is sending the communication from | —64 |
| <numberofstepsaday>250</numberofstepsaday> | The number of steps a person using fitbit performed in a single day | |
| <IP>172.16.1.2</IP> | The IP address of the device that is sending the communication | |

| Data structure | Description | |
|---|---|---|
| <device_type>smartbike</device_type> | The type of the device that sends the communication | |
| <manufactureID>BMW</manufactureID> | The name of the manufacture | |
| <country>US</country> | The country where the device is sending the communication from | —66 |
| <IPADD>172.16.1.2<IPADD> | The IP address of the device that is sending the communication | |
| <mileslastride>200</ mileslastride> | The number of miles in the last bike ride | |

| Company A | Enable for company A | Company B | Enable for company B | |
|---|---|---|---|---|
| <devicetype>fitbit </devicetype> | Yes | <device_type>smartbike</device_type> | No | |
| <manufacture>fitbit </manufacture> | No | <manufactureID>BMW</manufactureID> | Yes | —68 |
| <locationcountry>US</locationcountry> | No | <country>US</country> | Yes | |
| <IP>172.16.1.2</IP> | Yes | <IPADD>172.16.1.2<IPADD> | No | |

(56) References Cited

U.S. PATENT DOCUMENTS

| | | | |
|---|---|---|---|
| 2016/0182446 A1* | 6/2016 | Kong | H04L 69/08 709/245 |
| 2016/0203234 A1* | 7/2016 | Piccand | G06F 17/30917 707/798 |
| 2016/0205078 A1* | 7/2016 | James | H04L 63/0442 713/171 |
| 2016/0212099 A1* | 7/2016 | Zou | H04L 63/0263 |
| 2017/0237815 A1* | 8/2017 | Arsenault | H04L 67/12 709/217 |
| 2017/0257341 A1* | 9/2017 | Arsenault | H04L 61/20 |

* cited by examiner

| Data structure | Description |
|---|---|
| <devicetype>fitbit bracelet</devicetype> | The type of the device that sends the communication |
| <manufacture>fitbit </manufacture> | The name of the manufacture |
| <locationcounty>US</locationcounty> | The country where the device is sending the communication from |
| <numberofstepsaday>250</numberofstepsaday> | The number of steps a person using fitbit performed in a single day |
| <IP>172.16.1.2</IP> | The IP address of the device that is sending the communication |

— 64

| Data structure | Description |
|---|---|
| <device_type>smartbike</device_type> | The type of the device that sends the communication |
| <manufacturerID>BMW</manufacturerID> | The name of the manufacture |
| <country>US</country> | The country where the device is sending the communication from |
| <IPADD>172.16.1.2<IPADD> | The IP address of the device that is sending the communication |
| <mileslastride>200</ mileslastride> | The number of miles in the last bike ride |

— 66

| Company A | Enable for company A | Company B | Enable for company B |
|---|---|---|---|
| <devicetype>fitbit </devicetype> | Yes | <device_type>smartbike</device_type> | No |
| <manufacture>fitbit </manufacture> | No | <manufacturerID>BMW</manufacturerID> | Yes |
| <locationcountry>US</locationcountry> | No | <country>US</country> | Yes |
| <IP>172.16.1.2</IP> | Yes | <IPADD>172.16.1.2<IPADD> | No |

PROMOTION OF INTERNET-OF-THINGS (IOT) CONNECTIVITY

RELATED APPLICATIONS

This application claims the benefit of the Feb. 18, 2015 priority date of U.S. Provisional Application 62/117,572, the contents of which are herein incorporated by reference.

FIELD OF INVENTION

This invention relates to networking, and in particular, to networking of IoT devices via the internet.

BACKGROUND

The "Internet of Things," or "IoT," refers to a global network in which the nodes are not necessarily stand-alone workstations but rather, appliances and small embedded systems that have been provided with wireless connectivity. These appliances are collectively referred to as "IoT devices."

The IoT contemplates a world in which IoT devices talk to each other, exchanging data in real time. To some extent, the value of the IoT device will depend on how many other IoT devices it can communicate with.

Inter-IoT-device communication is hindered, however, by the fact that each IoT device manufacturer will implement its IoT devices in its own way. IoT devices may therefore be unable to communicate with each other because of different protocols, data structures and the like. Thus, interoperability between IoT devices is difficult.

In addition, because of the sheer number of different manufacturers, it may be difficult for an IoT device manufacturer to find other IoT devices that would add value to its own IoT devices if interoperability could be established.

The conventional approach that IoT device-makers follows to enlarge the number of different IoT devices their IoT devices can interoperate with is a laborious procedure. Typically, a second IoT device-maker comes to the attention of a first company. This meeting relies to a great extent on serendipity. The two IoT device-makers then reach an agreement concerning whether or not to partner at all. If they do, then the technical work begins. Suitable software must be written to enable interoperability of the two IoT devices. This software must then be tested and debugged. The entire process can take many man-months. And the net result of all this time is that interoperability has been enlarged by one IoT device.

While this procedure may be adequate in an industry in which only a few devices are required to interoperate, this is not the case with the IoT. In the IoT, it is important to achieve interoperability among as many IoT devices as possible.

SUMMARY

The invention provides a system and method for promoting formation of relationships between IoT device-makers and easing the software development task associated with achieving interoperability among multiple IoT devices.

The invention is directed generally to the abstract idea of commerce. However, the invention as claimed recites a specific apparatus and method that does not pre-empt the entire scope of the abstract idea of commerce but instead recites a concrete and tangible implementation that falls well short of the abstraction represented by the concept of commerce generally.

In one aspect, the invention features an apparatus that includes a data-processing system that implements a B2B IoT marketplace. Such a data-processing system includes a dictionary of data structures for each of a plurality of registered IoT devices; a translator for mapping a data structure in a first IoT device to a corresponding data structure in a second IoT device; and a platform configured for interaction with IoT device makers to enable a first IoT device maker to register an IoT device, and for enabling the first IoT device maker to identify other IoT devices with which the first IoT device is to establish operability.

Some embodiments, also have a database for storing associations between pairs of IoT devices.

In other embodiments, the platform is configured to receive information concerning data structures of an IoT device and to translate the information into a common format.

In yet other embodiments, the platform is configured to post information concerning an IoT device for availability to registered IoT device makers.

Also among the embodiments are those in which the platform is configured to receive, from a registered IoT device maker, limitations on connectivity to a registered IoT device, and those in which the platform is configured to receive and process a search query to identify an IoT device having selected characteristics.

In some embodiments, the platform is configured to provide, to a first IoT device maker, information necessary to form a business relationship with a second IoT device maker.

In other embodiments, the platform is configured to provide a user interface to enable an IoT device maker to map fields from a first IoT device to a second IoT device.

Also within the scope of the invention are embodiments that include combinations of any of the foregoing features.

The apparatus as claimed is implemented on a physical electronic device that consumes power and radiates heat. Such a device is a data processing system with a processor coupled to a memory and a mass storage medium. To the extent the claims could be construed to cover embodiments that are software per se, those embodiments are hereby disclaimed. To the extent the claims could be construed to cover embodiments not compliant with 35 USC 101 as of the time of filing this application, those embodiments are likewise disclaimed. The claims are only intended to cover embodiments that comply with 35 USC 101 as of the filing date of this application.

In another aspect, the invention features a method comprising providing a dictionary of data structures for each of a plurality of registered IoT devices; mapping a data structure in a first IoT device to a corresponding data structure in a second IoT device; enabling a first IoT device maker to register an IoT device, and enabling the first IoT device maker to identify other IoT devices with which the first IoT device is to establish operability.

Some practices also include storing associations between pairs of IoT devices.

Other practices include receiving information concerning data structures of an IoT device and translating the information into a common format.

Yet other practices include posting post information concerning an IoT device for availability to registered IoT device makers.

In other practices of the invention, there is included the step of receiving, from a registered IoT device maker, limitations on connectivity to a registered IoT device.

Also included are practices that further comprise receiving and processing a search query to identify an IoT device having selected characteristics.

Additional practices are those that include providing, to a first IoT device maker, information necessary to form a business relationship with a second IoT device maker, and those that include providing a user interface to enable an IoT device maker to map fields from a first IoT device to a second IoT device.

Also included within the scope of the invention are combinations of any of the foregoing practices.

Also included within the scope of the invention are non-transitory computer-readable media, not including signals, that have instructions that, when executed by a data processing system, execute any combination of the methods referred to above.

These and other features of the invention will be apparent from the following detailed description and the accompanying figures, in which:

BRIEF DESCRIPTION OF THE FIGURES

These and other features of the invention will be apparent from the following detailed description and the accompanying figures, in which:

FIG. 4 illustrates mapping of data structures; and

DETAILED DESCRIPTION

Figure 1:
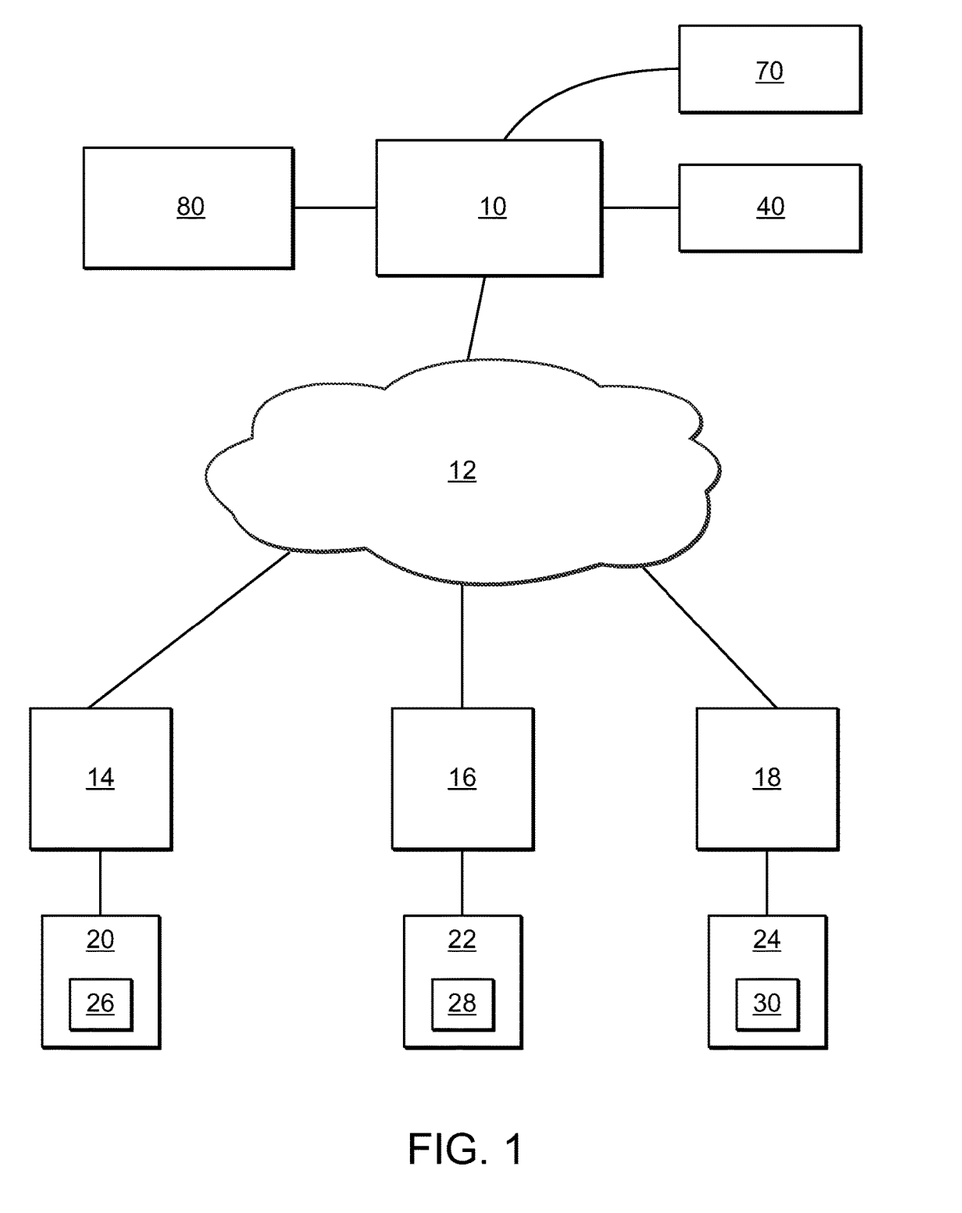
FIG. 1 shows a B2B-IOT platform.

FIG. 1 shows a B2B-IoT marketplace platform 10 that communicates via the cloud 12 with multiple registered companies 14, 16, 18 that manufacture IoT devices. Using the marketplace platform 10, a company 14, 16, 18 is able to show its corresponding IoT device 20, 22, 24 and its capabilities to other IoT device-makers 16, 18. The marketplace platform 10 enables the individual first, second, and third companies 14, 16, 18 to find each other within the B2B marketplace and to enter into agreements to establish interoperability with the respective first, second, and third IoT devices 20, 22, 24. Although each company is shown as making only one IoT device, this is for illustration only. In reality, it is quite possible for a company to manufacture many different kinds of IoT device.

Figure 2:
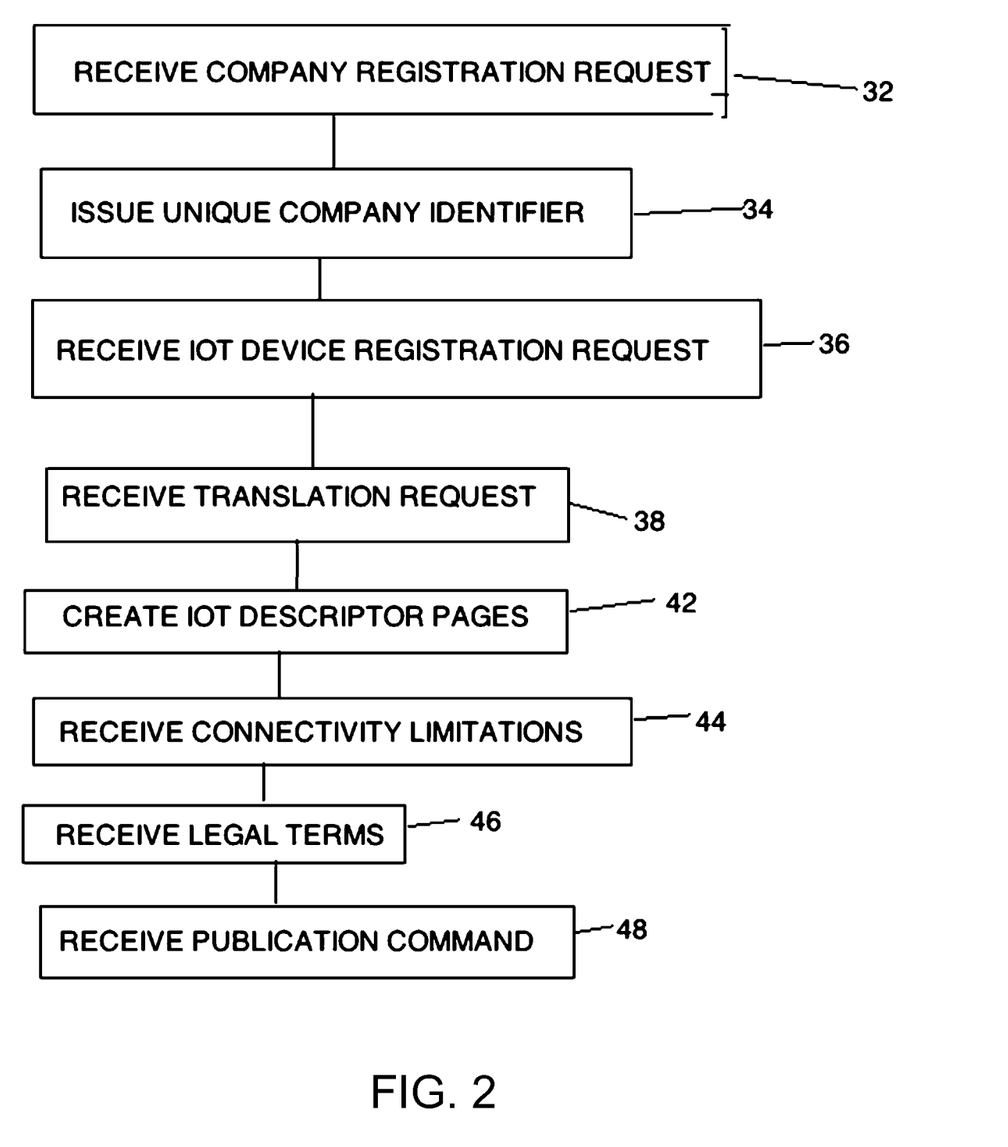
FIG. 2 is a flowchart of a registration procedure.

FIG. 2 shows the procedure carried out by the platform 10 to process registration of the first company 14 and the first IoT-device 20 made by the first company 14. The second and third companies 16, 18 will carry out similar procedures to register themselves and their respective second and third IoT devices 22, 24.

The procedure begins with the platform 10 receiving, typically via a web browser, a request for registration (step 32) that includes information concerning the first company 14, as well as information indicative of the first company's intent to conform to usage rules for using the platform 10. Upon satisfactory completion of the registration, the platform 10 issues a unique identifier to the first company 14 (step 34).

At this point, the registration of IoT devices begins. FIG. 2 shows steps for registration of the first IoT-device 20. If the first company 14 wishes to register additional IoT devices, these steps are repeated for each IoT device to be registered. Note that the registration applies to the IoT device itself and not to individual instances of the IoT device, of which there can be millions.

IoT device registration includes receiving a request to register the first IoT-device 20, together with information concerning the first IoT-device 20 (step 36). The first company 14 then writes suitable software for enabling communication between the first IoT-device 20 and the platform 10. The platform 10 receives exposed portions of the software and a request to use those exposed portions to create a dictionary 40 that translates the API interface of that software into a common format (step 38).

The first company then creates pages within the platform 10 with information concerning the first IoT-device 20 (step 42). This information will be posted so that other registered companies 16, 18 can see it and decide whether or not to take steps towards interoperability between their respective IoT devices 22, 24 and the first IoT-device 20. The information will also include information about exposed data that can be communicated to another IoT-device.

The next step is to receive information concerning imposition by the first company 14 of any limitations on connectivity with the first IoT-device 20 (step 44). This would include limitations on the number of connections, the geo-locations where connections will be permitted, and the types of IoT devices that will be permitted to connect to the first IoT-device.

Next, the platform 10 receives information concerning legal terms of use that govern the interoperability between the first IoT-device and any other IoT devices (step 46). When posted along with information concerning the IoT-device, this information is accompanied by some actuator for indicating intent of another company to comply with the terms, thus effectively creating a contract between the first company 20 and whoever actuates the actuator.

Finally, the platform 10 receives a publication command authorizing publication of all information submitted. At this point, the first IoT-device 20 is exposed to other companies 18, 20 who may be interested in establishing interoperability with their respective IoT devices 22, 24 and the first IoT-device 20.

Figure 3:
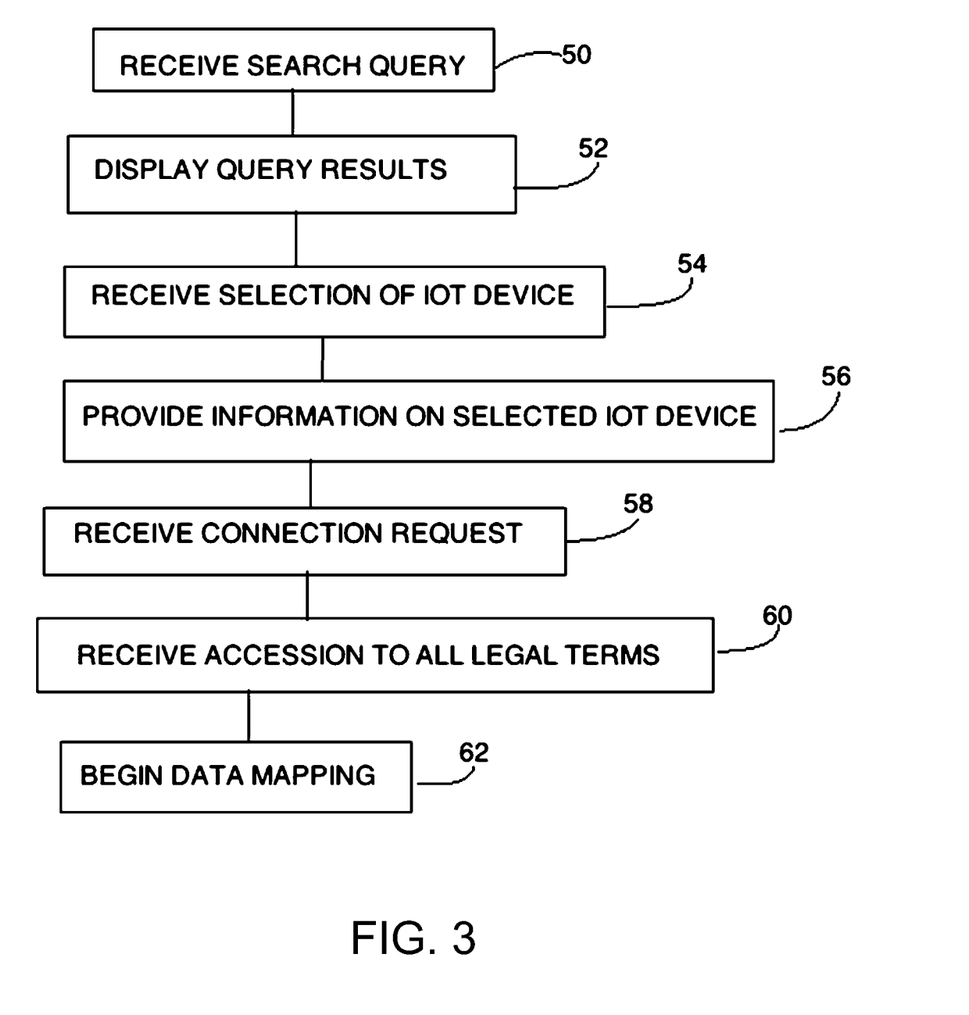
FIG. 3 is a flowchart showing steps in searching for an IoT device.

Referring now to FIG. 3, a second company 16 may be interested in identifying IoT devices with which its own IoT device 22 could establish interoperability. The platform 10 then receives search inquiries from the second company 16 as the second company 16 searches the B2B marketplace for suitable IoT devices (step 50). The search inquiry may contain, for example, a list of criteria that a suitable IoT device would be have to have.

In response, the platform 10 displays a page with results that match the criteria (step 52). The platform 10 then receives a selection by the second company 16 of an IoT device that is made by the first company 14 (step 54). In response, the platform 10 provides the first company 14 with information about the first IoT device 22 that was uploaded by the first company 14 during the registration process (step 56).

Assuming the second company 16 is interested in doing so, the platform 10 then receives a request from the second company 16 to establish communication with the first company 14 so that their respective IoT devices can be bound together (step 58). This marks the beginning of a business relationship between the first and second companies 14, 16 and the start of sharing data concerning the respective IoT devices 20, 22 using the platform 10. After acceding to all relevant legal terms (step 60) the companies 14, 16 begin mapping data from one IoT device to the other (step 62).

FIG. 4 shows selected data structures 64, 66 that have been exposed by the first and second companies 14, 16 concerning their respective first and second IoT devices 20, 22. The mapping process between the first and second IoT devices 20, 22 includes creating a table of accessible data structures 68. This mapping process is carried out by a translator 70 using entries for the first and second IoT devices 20, 22 in the dictionary 40.

Figure 5:
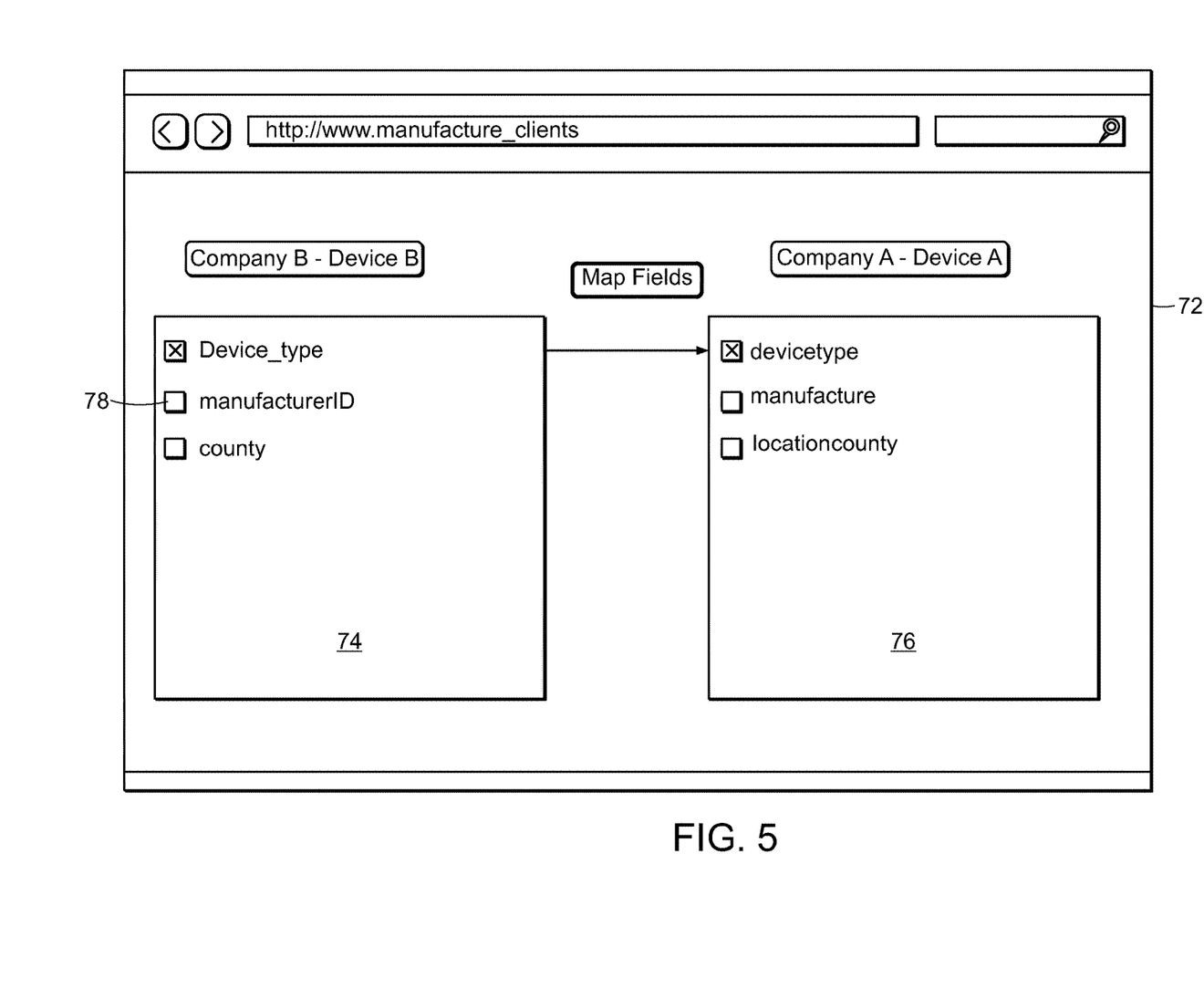
FIG. 5 shows a user-interface for mapping

FIG. 5 shows a user-interface that would be used by the second company 16 for carrying out the mapping procedure. The user-interface features a dialog box 72 that has a first field 74 for the first company 14 and a second field 76 for the second company 16. Each field 74, 76 shows available data structures 78 that can be mapped. Mapping is carried out by having the user drag and drop selected data structures between the first and second fields 74, 76. The resulting mapping is then stored in a database 80 and is uniquely assigned to the particular combination of the first and second IoT devices 20, 22.

An advantage of the procedure described herein is that the first company 14 is not burdened by having to develop an interface for each IoT device with which it would like the first IoT device 20 to establish operability. Instead, the first company 14 only has to write software to expose selected data structures in the format required by the platform 10. Since each registered company 14, 16, 18 will be using the same format, the translation procedure can be carried out automatically by the translator 70 using the exposed data structures that were acquired during company registration and stored in the database 80

Having described the invention, and a preferred embodiment thereof, what is claimed as new and secured by Letters Patent is:

1. An apparatus comprising a data-processing system that implements a B2B IoT marketplace in which IOT device makers are permitted to identify each other and to enter into agreements to establish interoperability between selected types of IoT devices that are made by different IoT device makers, said data-processing system comprising a memory and a processor coupled to said memory, wherein said memory has, stored therein, a dictionary of data structures for each of a plurality of registered IoT devices, said devices being made by different IoT device makers, a translator for mapping a data structure in a first IoT device to a corresponding data structure in a second IoT device, and wherein said processor and said memory cooperate to implement a platform configured for interaction with IoT device makers to enable a first IoT device maker to register an IoT device, and for enabling said first IoT device maker to identify other IoT devices made by other IoT device makers with which said first IoT device is to establish operability, thereby facilitating the establishment of interoperability between said IoT device and an IoT device from said other IoT devices made by said other IoT device makers.

2. The apparatus of claim 1, further comprising a database for storing associations between pairs of IoT devices, wherein the devices in each pair are made by different device makers.

3. The apparatus of claim 1, wherein said platform is configured to receive information concerning data structures of an IoT device and to translate said information into a common format.

4. The apparatus of claim 1, wherein said platform is configured to post information concerning an IoT device for availability to registered IoT device makers.

5. The apparatus of claim 1, wherein said platform is configured to receive, from a registered IoT device maker, limitations on connectivity to a registered IoT device.

6. The apparatus of claim 1, wherein said platform is configured to receive, from said first IoT device maker, a search query to identify an IoT device having selected characteristics.

7. The apparatus of claim 1, wherein said platform is configured to provide, to a first IoT device maker, information necessary to form a business relationship with a second IoT device maker.

8. The apparatus of claim 1, wherein said platform is configured to provide a user interface to enable an IoT device maker to map fields from a first IoT device to a second IoT device.

9. A method comprising, in a data processing system that comprises a processor coupled to a memory, providing, in said memory, a dictionary of data structures for each of a plurality of registered IoT devices, said IoT devices being made by different IoT device makers, mapping a data structure in a first IoT device to a corresponding data structure in a second IoT device, enabling a first IoT device maker to register an IoT device, and enabling said first IoT device make to identify other IoT devices made by other IoT device makers with which said first IoT device is to establish operability, thereby facilitating the establishment of interoperability between said IoT device and an IoT device from said other IoT devices made by said other IoT device makers.

10. The method of claim 9, further comprising storing associations between pairs of IoT devices, wherein the devices in each pair are made by different device makers.

11. The method of claim 9, further comprising receiving information concerning data structures of an IoT device and translating said information into a common format.

12. The method of claim 9, further comprising posting post information concerning an IoT device for availability to registered IoT device makers.

13. The method of claim 9, further comprising receiving, from a registered IoT device maker, limitations on connectivity to a registered IoT device.

14. The method of claim 9, further comprising receiving and processing a search query to identify an IoT device having selected characteristics.

15. The method of claim 9, further comprising providing, to a first IoT device maker, information necessary to form a business relationship with a second IoT device maker.

16. The method of claim 9, further comprising providing a user interface to enable an IoT device maker to map fields from a first IoT device to a second IoT device.

17. A manufacture comprising a non-transitory computer-readable medium comprising instructions that, when executed by a data-processing system having a processor and a memory that cooperate to define a platform configured for interaction with IoT device makers to enable a first IoT device maker to register an IoT device, and for enabling said first IoT device maker to identify other IoT devices made by other IoT device makers with which said first IoT device is to establish operability, wherein said memory stores a dictionary of data structures for each of a plurality of registered IoT devices made by different IoT device makers, cause execution of the steps of providing said dictionary of data structures, mapping a data structure in a first IoT device to a corresponding data structure in a second IoT device, enabling a first IoT device maker to register an IoT device, and enabling said first IoT device maker to identify other IoT devices made by other IoT device makers with which said first IoT device is to establish operability, thereby facilitating the establishment of interoperability between said IoT device and an IoT device from said other IoT devices made by said other IoT device makers.

18. The apparatus of claim 1, wherein said data structures comprise application-program interfaces.

* * * * *